US 9,704,049 B2
Jul. 11, 2017

(12) United States Patent
Peterson et al.

(54) DRIVER ASSIST SYSTEM UTILIZING AN INERTIAL SENSOR

(71) Applicant: Gentex Corporation, Zeeland, MI (US)

(72) Inventors: Christopher A. Peterson, Zeeland, MI (US); John C. Peterson, Grandville, MI (US)

(73) Assignee: GENTEX CORPORATION, Zeeland, MI (US)

(*) Notice: Subject to any disclaimer, the term of this patent is extended or adjusted under 35 U.S.C. 154(b) by 31 days.

(21) Appl. No.: 14/816,203

(22) Filed: Aug. 3, 2015

(65) Prior Publication Data

US 2016/0034770 A1 Feb. 4, 2016

Related U.S. Application Data

(60) Provisional application No. 62/032,894, filed on Aug. 4, 2014.

(51) Int. Cl.
| | | |
|---|---|---|
| *G06K 9/00* | (2006.01) | |
| *G06K 9/46* | (2006.01) | |
| *B60W 40/00* | (2006.01) | |
| *B60Q 1/08* | (2006.01) | |

(Continued)

(52) U.S. Cl.
CPC ......... *G06K 9/00825* (2013.01); *B60Q 1/085* (2013.01); *B60Q 1/10* (2013.01); *B60Q 1/143* (2013.01); *B60W 40/00* (2013.01); *G06K 9/4661* (2013.01); *B60Q 2300/112* (2013.01); *B60Q 2300/114* (2013.01);
(Continued)

(58) Field of Classification Search
CPC .... G06K 9/00825; G06K 9/4661; B60Q 1/10; B60Q 1/085; B60Q 1/143; B60Q 2300/42; B60Q 2300/114; B60Q 2300/41; B60Q 2300/112; B60W 40/00; G05D 3/10

See application file for complete search history.

(56) References Cited

U.S. PATENT DOCUMENTS

| 7,156,542 B2 | 1/2007 | Miller et al. | |
|---|---|---|---|
| 2008/0189036 A1* | 8/2008 | Elgersma | G06T 7/0069 382/153 |

(Continued)

FOREIGN PATENT DOCUMENTS

CN 201205893 Y * 3/2009

OTHER PUBLICATIONS

International Search Report and Written Opinion of the International Searching Authority dated Nov. 19, 2015 for International Application No. PCT/US2015/043448, filed Aug. 3, 2015.

*Primary Examiner* — Rodney Butler
(74) *Attorney, Agent, or Firm* — Price Heneveld LLP; Bradley D. Johnson

(57) ABSTRACT

The present disclosure relates to an apparatus configured to adjust a processing function for image data for a vehicle control system. The apparatus comprises an image sensor configured to capture the image data corresponding to a field of view. The image sensor is in communication with a controller which is further in communication with an accelerometer. The controller is operable to receive the image data from the image sensor and receive an acceleration signal from the accelerometer. The accelerometer signal may be utilized to identify a direction of gravity relative to the image sensor.

18 Claims, 6 Drawing Sheets

(51) Int. Cl.
    *B60Q 1/14*    (2006.01)
    *B60Q 1/10*    (2006.01)
(52) U.S. Cl.
    CPC .... *B60Q 2300/132* (2013.01); *B60Q 2300/41* (2013.01); *B60Q 2300/42* (2013.01)

(56) References Cited

U.S. PATENT DOCUMENTS

| | | | |
|---|---|---|---|
| 2009/0045323 A1* | 2/2009 | Lu | B60Q 1/1423 |
| | | | 250/208.1 |
| 2012/0200224 A1 | 8/2012 | Schofield | |
| 2013/0169812 A1* | 7/2013 | Lu | B60Q 1/1423 |
| | | | 348/148 |
| 2013/0250113 A1 | 9/2013 | Bechtel et al. | |
| 2013/0335569 A1* | 12/2013 | Einecke | G01S 13/867 |
| | | | 348/148 |
| 2014/0309888 A1* | 10/2014 | Smit | B62D 13/06 |
| | | | 701/41 |
| 2015/0028741 A1* | 1/2015 | Schmidt | G06K 9/00791 |
| | | | 315/82 |
| 2015/0165971 A1* | 6/2015 | Grundmann | B60Q 9/008 |
| | | | 348/148 |
| 2015/0175055 A1 | 6/2015 | Falb | |
| 2016/0306361 A1* | 10/2016 | Ben Shalom | B60W 30/00 |

* cited by examiner

DRIVER ASSIST SYSTEM UTILIZING AN INERTIAL SENSOR

CROSS REFERENCE TO RELATED APPLICATION

This Application claims priority of U.S. Provisional Application No. 62/032,894, filed on Aug. 4, 2014, and the entirety of which is incorporated by reference herein.

TECHNOLOGICAL FIELD

The disclosure relates to object detection for vehicles for enhanced operation.

BRIEF SUMMARY OF THE INVENTION

In one implementation, the present disclosure relates to an apparatus configured to adjust a processing function for image data for a vehicle control system. The apparatus comprises an image sensor configured to capture the image data corresponding to a field of view. The image sensor is in communication with a controller which is further in communication with an inertial sensor. The controller is operable to receive the image data from the image sensor and receive a directional signal from the inertial sensor. The directional signal may be utilized to identify a direction of gravity relative to the image sensor.

The controller is operable to initiate a function configured to scan the image data for at least one characteristic of a target vehicle. Based on the acceleration signal, the controller is operable to offset an origin of the field of view of the image data and generate an adjusted origin. The adjusted origin is then utilized to improve at least one processing function of the controller to identify the characteristic in the image data. The various implementations described herein may provide for improved systems and methods configured to efficiently and accurately identify a target vehicle.

These and other features, advantages, and objects of the present invention will be further understood and appreciated by those skilled in the art by reference to the following specification, claims, and appended drawings.

DETAILED DESCRIPTION

Figure 1A:
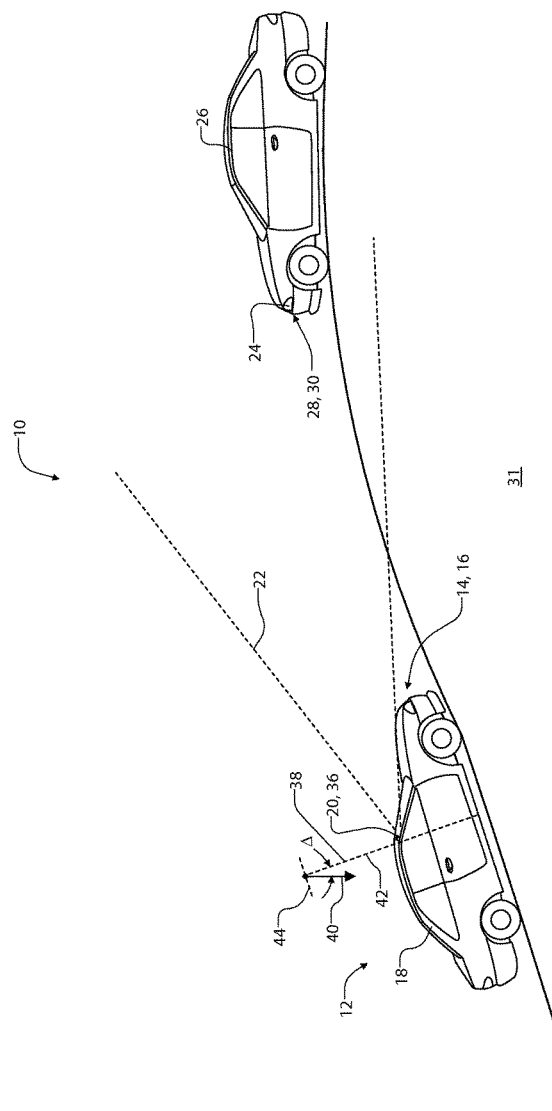
FIG. 1A is an environmental view of a host vehicle comprising an intelligent headlight system.

For purposes of description herein the terms "upper," "lower," "right," "left," "rear," "front," "vertical," "horizontal," and derivatives thereof shall relate to the device as oriented in FIG. 1A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1A, an operating environment 10 for a controller 12 is shown. The controller 12 may be operable to output at least one control signal to one or more systems, for example a driver assist system. In an exemplary embodiment, the driver assist system may correspond to a headlight system 14. Though discussed in reference to the system 14, the controller 12 may be utilized to output one or more control signals for vehicle systems including, but not limited to, a lane departure warning system, a collision detection system, a vehicle guidance system, etc.

The system 14 is configured to adjust an illumination pattern, for example high-beam or low-beam, of each a plurality of headlamps 16 of a host vehicle 18. The controller 12 is in communication with an image sensor 20 configured to capture data corresponding to a field of view 22. Based on the data, the controller 12 is operable to detect at least one characteristic 24 corresponding to a target vehicle 26. In response to detecting the at least one characteristic 24, the controller 12 is configured to control the illumination pattern of the plurality of headlamps 16. In this way, the system 14 is operable to ensure that the lighting of the environment 10 from the host vehicle 18 is safely maintained while limiting a glare light 28 directed toward the target vehicle 26.

A characteristic 24 used to identify the target vehicle 26 may refer to a light source, for example one or more headlamps, taillights, running lights, etc. The controller 12 is operable to detect the target vehicle 26 by identifying the at least one characteristic 24, and further by identifying the movement and/or behavior of the at least one characteristic 24 over time. The motion of the at least one characteristic 24 may be determined based on the relative location of the characteristic 24 in a sequence of image data corresponding to a temporal period. For example, the controller 12 is operable to identify a plurality of target headlamps 30 of the target vehicle 26 based on the relative positions of the target headlamps 30 in the sequence of image data.

The controller 12 may further identify the target headlamps 30 based on their location in the field of view 22. Based on the location of the target headlamps 30 or the at least one characteristic 24 and the corresponding motion in the field of view 22, the controller 12 is operable to determine whether the at least one characteristic 24 corresponds to the target vehicle 26 or a non-target light source. In some implementations, the controller 12 is operable to adjust a processing window of the image data corresponding to the field of view 22 and/or an origin or horizon of the field of view 22 to improve the detection of the characteristic 24 and ensure that the target vehicle 26 may be consistently and accurately identified.

Figure 1B:
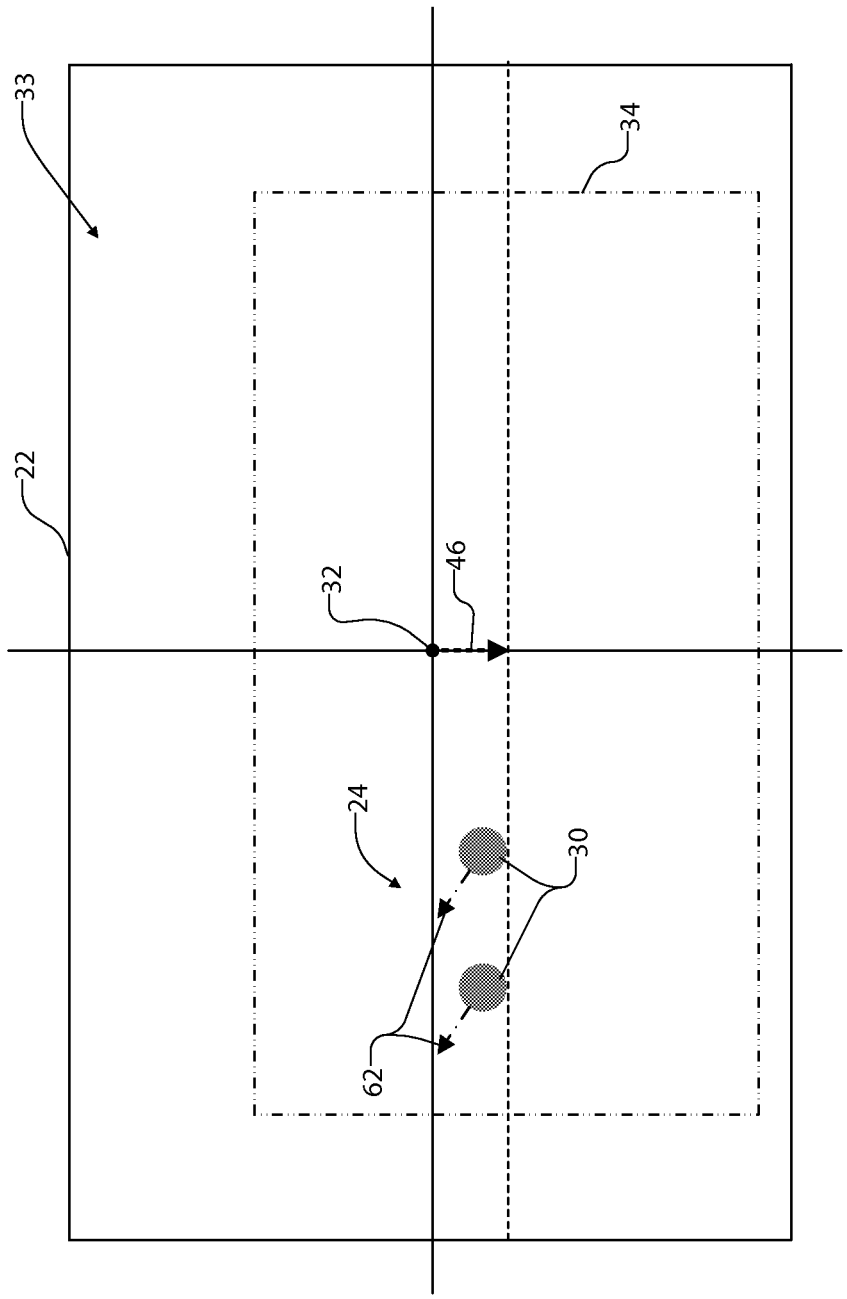
FIG. 1B is a diagram demonstrating an offset of an origin of image data received from an intelligent headlight system.

Referring now to FIGS. 1A and 1B, the controller 12 is operable to identify the instantaneous slope of a hill 31 of the operating environment 10 in order to improve the detection of the at least one characteristic 24. Further, the detection may provide for the system 14 to filter the data from the image sensor 20 corresponding to the field of view 22 to limit false detections. False detections may correspond to non-target light sources as discussed herein. Based on the slope of the operating environment 10, the controller 12 is configured to adjust the approximate horizon or origin 32 of the image data 33 from the image sensor 20 and/or adjust a processing window 34 of the image data 33 to efficiently identify the target vehicle 26. In this way, the controller 12 may improve the efficiency and accuracy of detecting the target vehicle 26.

In an exemplary implementation, the controller 12 is in communication with an inertial sensor 72 (FIG. 3). The inertial sensor may be integrated into the system 14 or may be in communication with the system 14 via one or more inputs into the controller 12 from any vehicle system comprising an inertial sensor as discussed herein. In some implementations, the controller 12 may further be in communication and/or be combined with a lane departure system or any form of driver-assist system operable to assist in the operation of the vehicle (e.g. collision detection, vehicle guidance, etc.). In such implementations, the origin 32 and/or processing window 34 of the field of view 22 may similarly be adjusted by the controller 12 in response to the signal received from the inertial sensor 72. A block diagram of the system 14 in communication with the inertial sensor 72 and the controller 12 is discussed in reference to FIG. 3.

The inertial sensor 72 may correspond to a variety of devices that may be configured to measure and/or track an orientation of the host vehicle 18 with respect to gravity. For example, the inertial sensor 72 may correspond to an accelerometer, a gyroscope, and inertial measurement unit (IMU), and other sensors that may be operable to generate measurements that may be utilized to identity an orientation of the host vehicle 18. An accelerometer may correspond to a multi-axis accelerometer configured to measure acceleration of the host vehicle along a plurality of axes. An output from the accelerometer may provide a signal to the controller 12, such that the controller can identify a directional acceleration of the host vehicle 18 and may also provide a direction of gravity to identify the orientation of the host vehicle 18.

A gyroscope may be configured to measure a rotation of the host vehicle 18. The gyroscope may be in communication with the controller 12 and configured to output a signal to communicate an orientation based on changes in a rotational velocity of the host vehicle 18. The signal from the gyroscope may require some filtering and a calibration or offset, but may provide for consistent indication of the orientation of the host vehicle 18. In this way, the controller may utilize the gyroscope to determine the rotation or orientation of the host vehicle 18 to identify whether the host vehicle 18 is on a hill, traveling through a valley, or in any orientation.

In some implementations, the inertial sensor 72 may be incorporated in a vehicle accessory. Some accessories may include a rearview display device 36, an overhead console interface, a side mirror, and other various devices of the host vehicle 18. In an exemplary implementation, the inertial sensor 72 may be incorporated with the image sensor 20 in a rearview display device 36 and/or mirror. The controller 12 may be operable to calibrate and/or offset the measurements of the inertial sensor 72 based on a particular orientation of the rearview display device 36. The calibration may align a normal vector 38 of the host vehicle 18 to a direction of gravity 40. In this way, the controller 12 may consistently monitor a direction of gravity 40 relative to the normal vector 38 of the host vehicle 18.

Once the orientation and/or rotation of the host vehicle 18 is identified by the controller 12, the controller 12 may utilize the orientation information of the host vehicle 18 to process image data from the image sensor 20. For example, the controller 12 may offset a processing window or portion of the image data based on the orientation information. In this way, the controller 12 may process image data from the image sensor 20 to efficiently and accurately identify objects in the image data. The controller 12 may improve upon an efficiency and accuracy by processing imaging data likely to contain at least one object of interest based on the orientation information.

In some embodiments, the inertial sensor 72 may correspond to a hybrid device comprising an accelerometer and a gyroscope, for example an IMU. In such embodiments, a hybrid accelerometer/gyroscope may further provide for improved accuracy in determining the orientation of the host vehicle 18. In such implementations, the accelerometer may be used to by the controller 12 to determine when the host vehicle 18 is accelerating. The accelerometer may also be utilized to calculate the orientation of the host vehicle 18 angle based on gravity. Additionally, the controller may utilize orientation information from the gyroscope to identify the rotation of the host vehicle 18 relative to a calibration/offset. In this way, noise may be filtered from the orientation information or an acceleration signal from the accelerometer and the gyroscope in order to accurately identify changes in speed and rotational changes of the host vehicle 18.

In some implementations, the inertial sensor 72 may be incorporated in a vehicle accessory. Some accessories may include a rearview display device 36, an overhead console interface, a side mirror, and other various devices of the host vehicle 18. In an exemplary implementation, the inertial sensor 72 may be incorporated with the image sensor 20 in a rearview display device 36 and/or mirror. The controller 12 may be operable to calibrate and/or offset the acceleration measurements of the inertial sensor 72 based on a particular orientation of the rearview display device 36 to align a normal vector 38 of the host vehicle 18 to a direction of gravity 40. In this way, the controller 12 may consistently monitor a direction of gravity 40 relative to the normal vector 38 of the host vehicle 18.

Still referring to FIGS. 1A and 1B, based on the data or image data corresponding to the field of view 22, the controller 12 is operable to discriminate between the target vehicle 26 and a plurality of non-target objects that may correspond to false detections of an approaching vehicle. Non-target objects may correspond to any object that may be identified proximate a road on which the host vehicle 18 is operating, for example signs, traffic lights, street lights, reflectors, reflections of headlamps, etc. The controller 12 may be operable to limit a detection of non-target objects or inaccurate detections of target vehicles 26 at least in part by adjusting a position of the horizon and/or origin 32 and adjusting a processing window 34 in which the target vehicle 26 may be detected in the field of view 22.

Adjusting the processing window 34 of the field of view 22 may limit and/or prioritize the image data scanned by the controller 12 to focus on data in which the target vehicle 26 and any approaching vehicles are expected based on the orientation or direction of gravity relative to the host vehicle 18. By adjusting the origin 32 of the field of view 22 and/or adjusting the processing window 34, the controller 12 may scan the image data to efficiently and accurately identify characteristics corresponding to approaching vehicles to control various driver assist systems, for example the headlight system 14 of the host vehicle 18. By adjusting the processing window 34 and/or origin 32, the controller 12 is operable to determine the most relevant portion of the image data 33 to scan based on the direction of gravity 40 relative to the normal vector 38 of the host vehicle 18.

Identifying the target vehicle 26 may be completed by the controller 12 by a number of processing methods. For example, the target vehicle 26 may be distinguished from a non-target object by detecting the at least one characteristic 24 (e.g. target headlamps 30) in the image data 33 and identifying a movement of the headlamps 30 in subsequent images or image data received from the sensor 20. The detection of the vehicles similar to the target vehicle 26 discussed herein is further described in U.S. patent application Ser. No. 09/799,310 entitled "IMAGE PROCESSING SYSTEM TO CONTROL VEHICLE HEADLAMPS OR OTHER VEHICLE EQUIPMENT," filed Mar. 5, 2001, to Joseph S. Stam et al., now U.S. Pat. No. 6,631,316; U.S. Pat. No. 6,868,322, entitled "IMAGE PROCESSING SYSTEM TO CONTROL VEHICLE HEADLAMPS OR OTHER VEHICLE EQUIPMENT," filed Mar. 15, 2005, to Joseph S. Stam et al.; U.S. Pat. No. 7,613,327, entitled "VEHICLE AUTOMATIC EXTERIOR LIGHT CONTROL," filed Nov. 3, 2009, to Joseph S. Stam et al., which are hereby incorporated herein by reference in their entirety.

As discussed herein, the controller 12 is configured to receive an acceleration signal or orientation information from the inertial sensor 72. Based on the acceleration signal and/or the orientation information, the controller 12 may be configured to determine an orientation of the host vehicle relative to a direction of gravity 40. In the example demonstrated in FIG. 1A, the host vehicle 18 is shown climbing the hill 31. As the host vehicle ascends the hill 31, the inertial sensor 72 communicates a change in the direction of gravity Δ and/or orientation information corresponding to the incline or slope of the hill 31. This detection may be identified based on a change of the direction of gravity over a plurality of samples of the acceleration or orientation data. In some embodiments, the controller 12 may be configured to receive a plurality of samples of acceleration data relative to a first axis 42 and a second axis 44 of the accelerometer. Additionally, the detection may be identified based on the orientation signal corresponding to the rotational velocity of the gyroscope.

In some implementations, the direction of gravity over a number of samples may be averaged by the controller 12 to identify the direction of gravity. The average direction of gravity may correspond to a level surface during sufficient operation of the host vehicle 18. The direction of gravity determined by the controller 12 may be stored and updated throughout operation to compensate for an adjustment of an orientation of the inertial sensor 72 relative to the normal vector 38 of the host vehicle 18. This may be particularly valuable in implementations that integrate the inertial sensor 72 in the rearview display device 36. Additionally, in some embodiments, various filtering and signal processing techniques may be utilized to improve the integrity and/or quality of one or more signals utilized to determine the orientation of the host vehicle 18.

Once the direction of gravity and/or the orientation of the host vehicle 18 is identified, a trend denoting the change in the direction of gravity Δ may be detected based on the shift in the direction of gravity exceeding a filtering threshold. This change may be updated by the controller 12 for each image received from the image sensor 20. The filtering threshold may require that the shift in the direction of gravity exceed a minimum slope value and/or maintain a change in slope for a predetermined period of time. The filtering threshold may serve to limit effects of signal noise and bumps that may otherwise affect the performance of the controller 12.

Once the change in the direction of gravity Δ and/or the orientation of the host vehicle 18 is determined relative the normal vector 38 of the host vehicle 18, the horizon or origin 32 of the sensor data may be adjusted in the field of view 22 relative to the angle of the change in the direction of gravity Δ. For example, the origin 32 or the horizon corresponding to the image data 33 from the image sensor 20 may be adjusted by a downward shift 46 based on the change in the direction of gravity Δ denoting that the host vehicle 18 is traveling up the hill 31. The controller 12 may shift the origin 32 of the image data 33 downward in response to the change in the direction of gravity Δ being shifted toward a rear portion of the host vehicle 18. In this way, the controller 12 is operable to search for the at least one characteristic 24 of the target vehicle 26 in the adjusted processing window 34 to accurately detect the target vehicle 26. Once the target vehicle 26 is identified, the controller 12 is configured to adjust the level or aim of the headlamps 16 to ensure that the glare light emitted from the headlamps 16 does not distract the operator of the target vehicle 26.

The downward shift 46 of the origin 32 may increase relative to the severity of the incline or grade of the hill 31 by measuring the change in the direction of gravity Δ. By adjusting the origin 32, the accuracy and efficiency at which the controller 12 is operable to detect the at least one characteristic 24 of the target vehicle 26 may be increased. This increase may be due to the controller 12 being operable approximate a region of the field of view 22 in which the target vehicle 26 may likely be located. The system 14 provides for improved detection of the target vehicle 26 by utilizing the acceleration data to adjust the processing window 34 and/or origin 32 of the image data 33 relative the field of view 22.

In some embodiments, the orientation of the host vehicle 18 and/or the direction of gravity Δ may be used for any system for the host vehicle 18 in communication with the controller 12. Such systems may include various vision and/or driver assist systems, which may incorporate an image sensor and/or be configured to process image data. Such systems may utilize the direction of gravity Δ and/or the orientation of the host vehicle 18 relative to the normal vector 38 to improve at least one of an object identification and/or search routine object identification and/or the search routine may be performed on the image data for the identification of one or more characteristics that may be captured in the image data. For example, the direction of gravity Δ and/or the orientation of the host vehicle 18 may be utilized by a lane departure warning system, a pedestrian/object detection system, a video display system, etc. to identify a portion or region of the image data that may likely contain an object of interest relevant to the specific system.

Figure 2A:
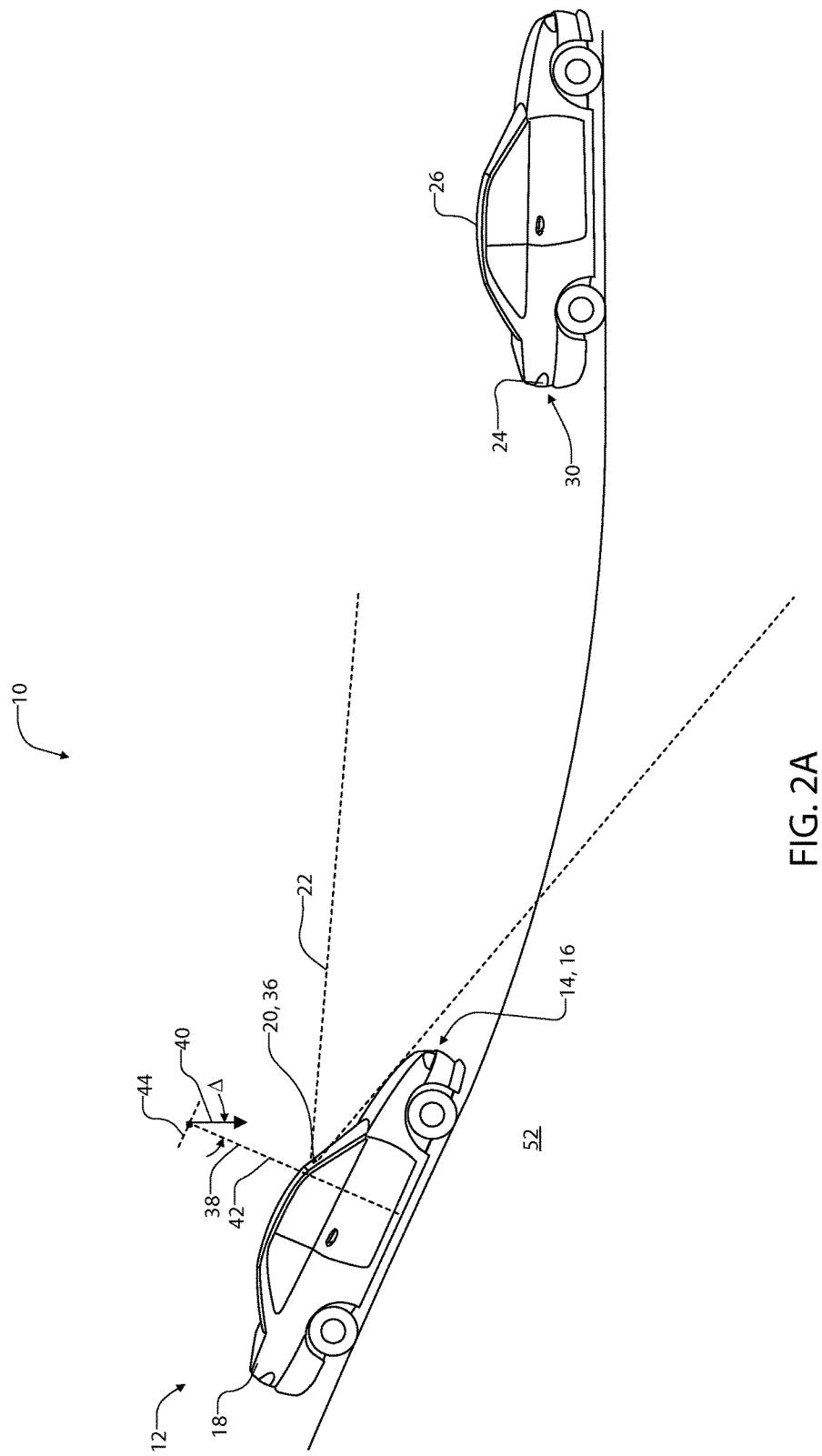
FIG. 2A is an environmental view of a host vehicle approaching a crest of a hill.
Figure 2B:
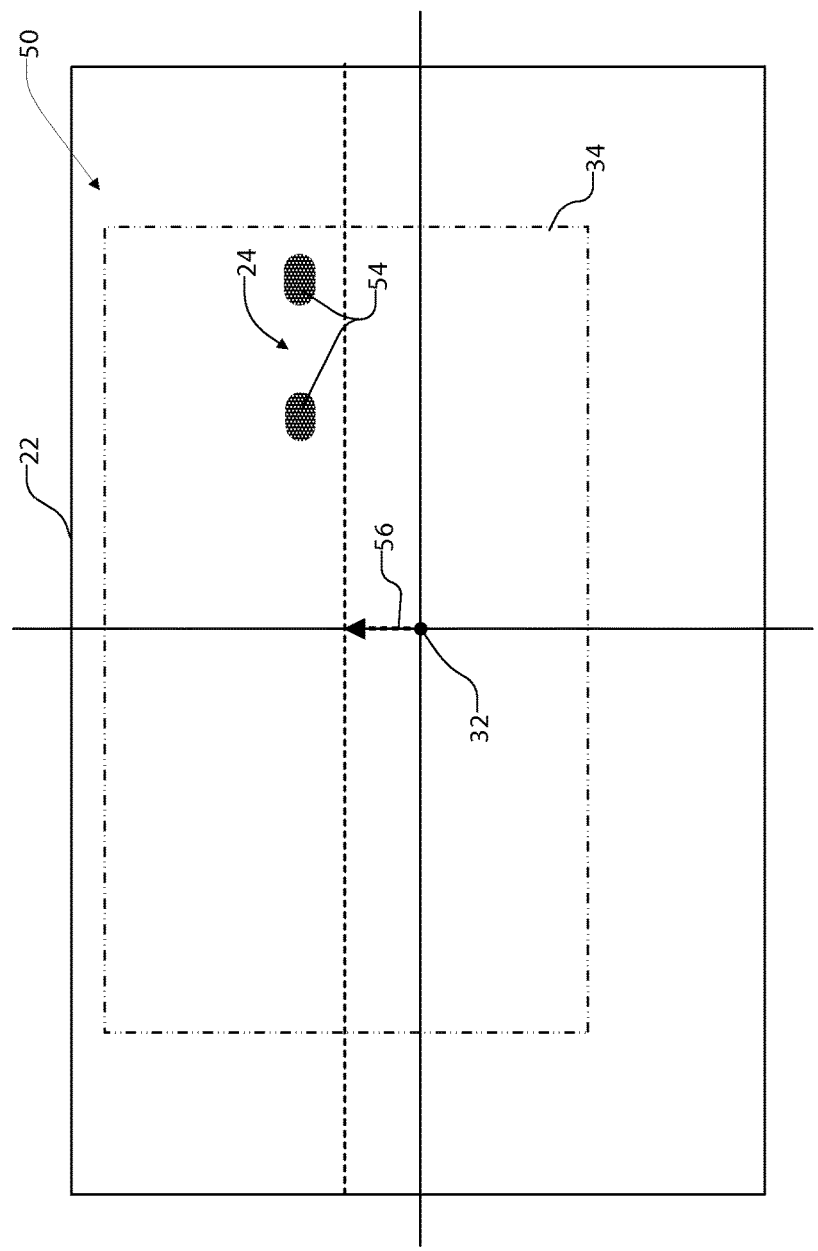
FIG. 2B is an environmental view of a host vehicle approaching a valley.

Referring to FIGS. 2A and 2B, the host vehicle 18 and corresponding image data 50 are demonstrated for the host vehicle 18 descending a hill 52. As discussed herein, the controller 12 is operable to detect a variety of characteristics to identify the target vehicle 26. In this example, the controller 12 is demonstrated detecting taillights 54 of the target vehicle 26. Based on the change in the orientation of the host vehicle 18 or direction of gravity Δ, the controller 12 is configured to apply an upward shift 56 of the processing window 34 and/or the origin 32 to focus on the relevant portion of the field of view 22 during the descent. As the host vehicle 18 descends the hill 52, the inertial sensor 72 communicates the change in the orientation of the host vehicle 18 and/or direction of gravity Δ due to the decline of the hill 52. This detection is identified based on a change of the direction of gravity and/or changes in the rotational velocity measured by the inertial sensor 72. The identification may be processed over a plurality of samples of the orientation data and/or acceleration data. For example, the acceleration data may be identified from measurements of the first axis 42 and the second axis 44 of the accelerometer. Though the first axis 42 and the second axis 44 are discussed in reference to the accelerometer, an accelerometer may comprise a plurality of axes. Additionally, in embodiments, a gyroscope may be utilized to measure orientation information, and/or the direction of gravity Δ relative the normal vector 38 of the host vehicle 18.

Once the change in the orientation of the host vehicle 18 and/or direction of gravity Δ relative the normal vector 38 of the host vehicle 18 has been determined, the horizon or origin 32 of the sensor data may be adjusted by the upward shift 56. The upward shift may be based on the change in the direction of gravity Δ and/or the orientation of the host vehicle 18. For example, the controller 12 may shift the origin 32 and/or processing window 34 of the image data 50 upward in response to the change in the direction of gravity Δ being shifted toward a front portion of the host vehicle 18. In this way, the controller 12 is operable to search for the at least one characteristic 24 of the target vehicle 26 in the adjusted processing window 34 to efficiently and accurately detect the target vehicle 26.

Referring again to FIG. 1A, the controller 12 may be operable to determine a speed of the host vehicle 18 from the acceleration signal to improve the detection of a target vehicle 26. As discussed herein, the controller 12 may detect the target vehicle 26 based on the location of the at least one characteristic 24 in the image data 50. The controller 12 is operable to detect the target vehicle 26 based on the relative location of the target vehicle 26 in a sequence of image data received from the image sensor 20. For example, if a target vehicle 26 is approaching the host vehicle 18, the target headlamps 30 of the target vehicle 26 may move along an anticipated path 62 in the sequence of images. The headlamps 30 may begin in a central portion of the field of view 22 and move outward in the field of view 22.

In order to determine an expected rate of change of the position of the target headlamps 30, the controller 12 may utilize the vehicle speed, as may be determined from the accelerometer signal, to determine an expected rate of change of the position of the target headlamps 30. Determining the expected rate of change of the position of the target headlamps 30 may ensure that the light source corresponds to an approaching vehicle and avoid detections corresponding to non-target light sources. By identifying the speed of the host vehicle 18 based on the accelerometer data, the controller 12 is operable to improve the accuracy of the detection the target vehicle 26 by estimating the expected behavior of the target headlamps 30 and the at least one characteristic 24 as discussed herein.

Figure 3A:
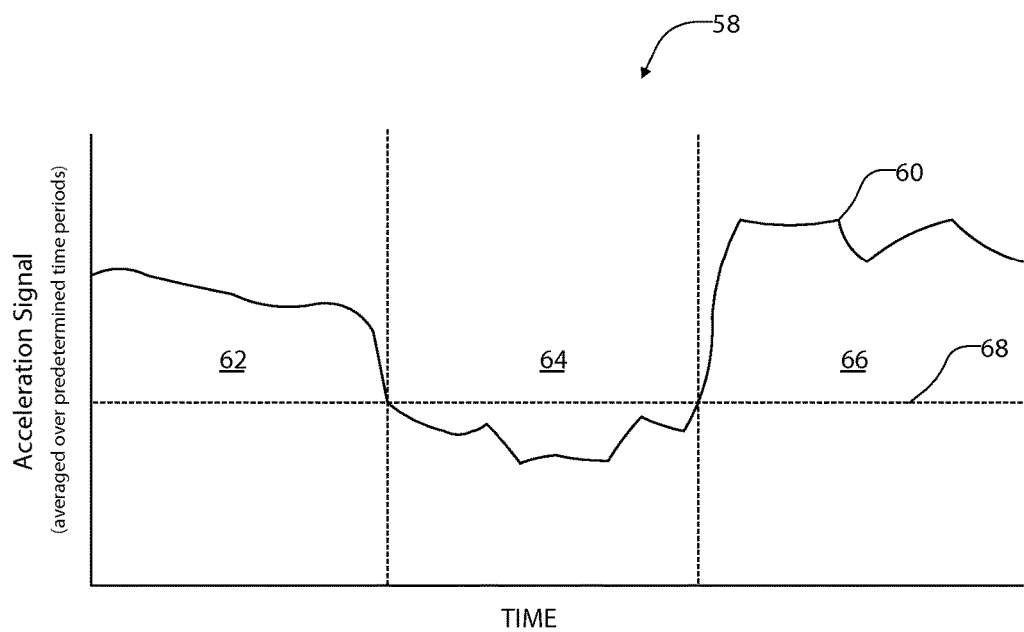
FIG. 3A is a graphical depiction of an accelerometer measurement.

The estimated speed of the host vehicle 18 may be identified from the accelerometer 72 based on a variety of operating conditions of the host vehicle 18. In a first operating condition, the controller 12 may determine if the host vehicle 18 is stopped. Referring to FIG. 3A, a graphical depiction 58 of an average accelerometer signal 60 is shown for a vehicle decelerating 62, stopped 64, and accelerating 66. The stopped condition may be identified by the accelerometer signal having a small amount of noise below a predetermined threshold or a noise motion threshold 68. When the host vehicle is traveling down a road, the amount of background noise detected by the accelerometer signal 60 may increase above the noise-motion threshold such that the controller 12 can identify the host vehicle 18 is in motion.

The noise-motion threshold 68 may be determined based on the average difference in acceleration among consecutive data samples from the accelerometer. When this noise level (e.g. acceleration signal 60) falls below the noise-motion threshold 68, the host vehicle 18 can be considered to be stopped. The noise-motion threshold 68 may vary based on the vehicle type and various operating conditions of the vehicle. For example, the noise-motion threshold 68 may be updated based on an initial calibration of the noise-motion threshold for a particular vehicle. The noise motion threshold 68 may also be updated or compensated during the startup and operation of the host vehicle 18 to account for changes in the vibrations associated with the host vehicle 18 over time.

In an additional operating condition, the controller 12 may determine if the host vehicle is accelerating or decelerating. The controller 12 may utilize the signal from the accelerometer to estimate a change in speed by integrating acceleration over time. The change in speed of the host vehicle 18 is determined based on the change in the measured acceleration of the host vehicle 18 in a direction multiplied by the amount of time of the acceleration. By measuring a plurality of acceleration values of the host vehicle 18 in the direction that the host vehicle 18 is traveling at a time interval and multiplying each of the acceleration values by the time interval, the controller 12 is operable to determine the speed of the host vehicle 18 by summing the changes in speed. This technique provides for the speed of the host vehicle 18 to be determined when accelerating or decelerating.

In yet another operating condition, the controller 12 is operable to determine the speed of the host vehicle 18 when the host vehicle 18 is turning. When the host vehicle 18 is turning right or left, the accelerometer may communicate an acceleration perpendicular to the forward operating direction of the host vehicle 18 or a centripetal acceleration. The centripetal acceleration may be utilized in combination with a turning rate of the host vehicle 18 to determine the velocity of the host vehicle 18 while undertaking a turn.

The velocity of the host vehicle 18 during a turn may be determined by the controller 12 by dividing the centripetal acceleration of the host vehicle 18 by the angular velocity. The angular velocity of the host vehicle 18 may be measured by a direction detection device, for example a magnetometer, compass, etc., in communication with the controller 12. The angular velocity may be determined by the controller 12 by monitoring a compass heading received from the compass over a period of time. With the angular velocity, the controller 12 may determine the velocity of the host vehicle 18 by dividing the centripetal acceleration by the angular velocity of the host vehicle 18.

Figure 3B:
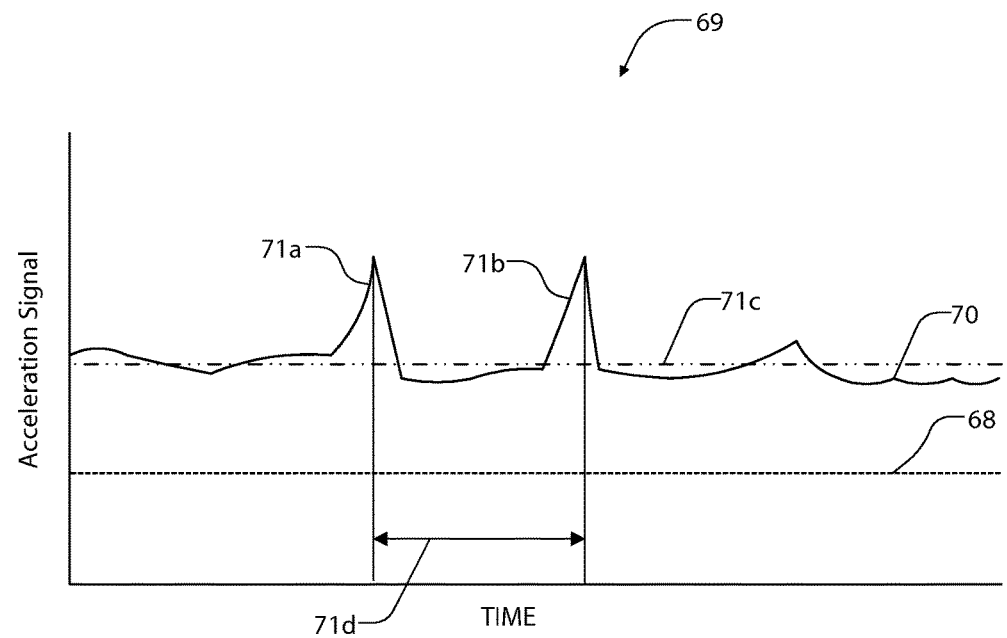
FIG. 3B is a graphical depiction of an accelerometer measurement.

Referring now to FIG. 3B, a graphical depiction 69 of an exemplary acceleration signal 70 of the accelerometer 72 is shown. The acceleration signal may correspond to a z axis measurement of the host vehicle 18. The controller 12, is further operable to determine the velocity of the vehicle and/or eliminate outlying data received from the accelerometer corresponding to one or more bumps or holes. The controller 12 may calculate the velocity of the vehicle by monitoring the accelerometer signal for a pair of similar spikes 71a and 71b differing from an average accelerometer signal 71c. A time 71d between the spikes may be determined by the controller 12. The controller 12 may also then divide the distance of the wheel base of the host vehicle 18 by the time 71d between the acceleration spikes to determine the velocity of the host vehicle 18. The controller may filter out spikes that occur in groupings that exceed pairs and may also only utilize pairs of spikes that correspond to a reasonable range of speed, for example five miles per hour to 90 miles per hour.

Figure 4:
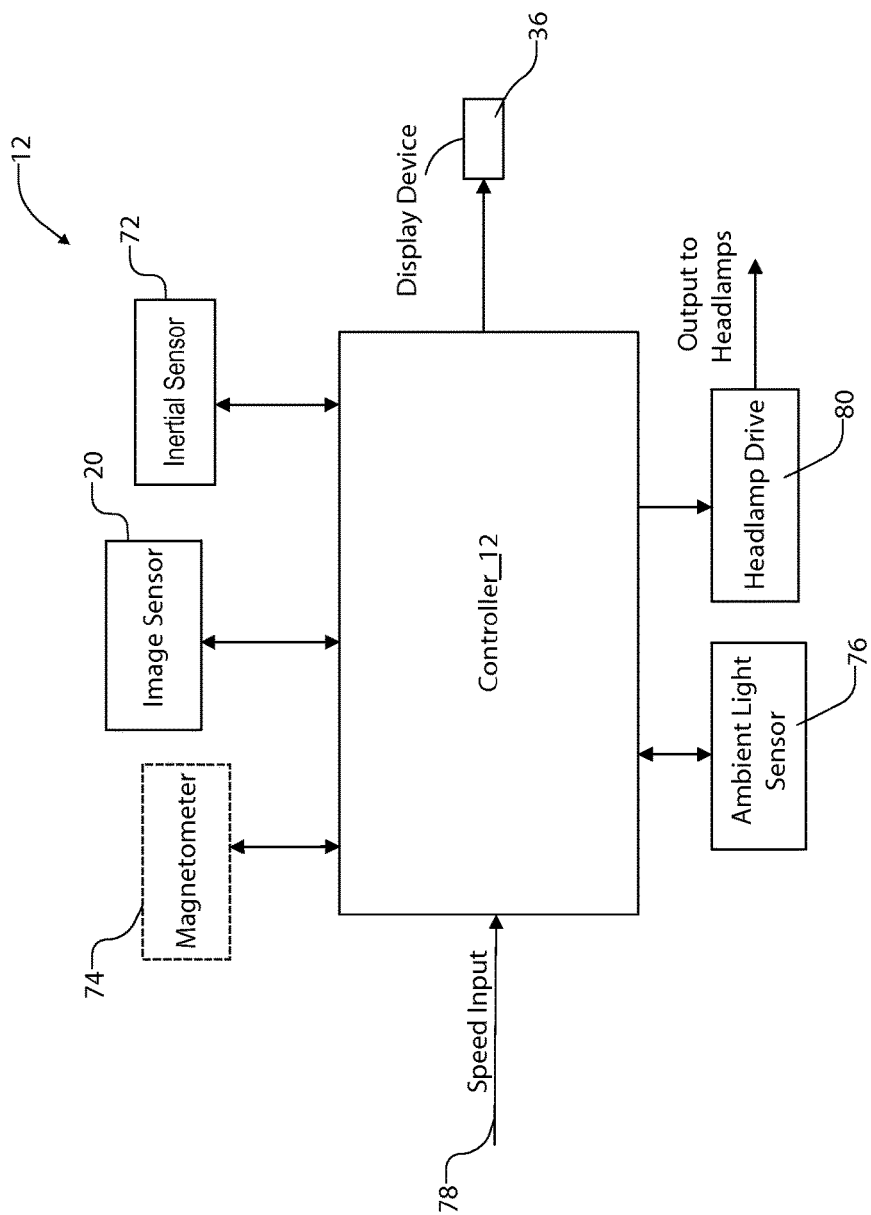
FIG. 4 is a block diagram of a controller configured to control an intelligent headlight system.

Referring to FIG. 4, a block diagram of the controller 12 is shown. The image sensor 20 is in electrical communication with the controller 12 which comprises a processor. The processor is configured to receive image data from the image sensor 20. The processor is further configured to process images corresponding to the image data to detect the at least one characteristic 24. The processor may be in communication with a memory configured to process the image data and acceleration data as discussed herein. The processor may be implemented using a microcontroller, a microprocessor, a digital signal processor, a programmable logic unit, a discrete circuitry, or any combination thereof. Additionally, the microcontroller may be implemented using more than one microprocessor.

The controller 12 is shown in communication with the inertial sensor 72, the image sensor 20, and a compass 74. The inertial sensor 72 may comprise a 3-axis accelerometer, a gyroscope, an IMU, and various other devices operable to measure an orientation and/or change in an orientation of the host vehicle 18. The inertial sensor 72 may be configured to measure a range of approximately +/−4 g at a resolution of approximately 16-bits. The inertial sensor 72 may further be operable to operate in a wide range of temperatures and have an effective sampling rate of approximately 25 Hz. The orientation information and/or acceleration signal as discussed herein may include a plurality of signals which may correspond to each axis of an accelerometer and various additional orientation information. Though specific performance characteristics corresponding to the inertial sensor 72 are discussed herein, a variety of inertial sensors may be utilized according to the particular precision, operating parameters of the system 14, and the operating conditions/environments of the host vehicle 18.

The image sensor 20 may be of a variety of types, such as a light sensor or image sensor, configured to detect light emitted from a light source of the target vehicle 26. In the example demonstrated in FIG. 1A, the target vehicle is in the form of an approaching motor vehicle and the light source corresponds to the target headlamps 30 of the target vehicle 26. The light source or characteristic 24 identified by the controller 12 to detect the target vehicle 26 may also comprise taillights, running lights, or any other identifying characteristic corresponding to the target vehicle 26.

In some implementations, the image sensor 20 may be implemented as a radar sensor, such as a Doppler radar transceiver which is capable of determining whether a vehicle is approaching or receding from the sensor and/or determining speed and distance. In implementations utilizing the image sensor 20, the controller 12 may further be in communication with an ambient light sensor 76 configured to measure an ambient light level. Based on the ambient light level, the controller 12 is configured to select a threshold level to compare to the light level sensed by the image sensor 20. In this way, the controller 12 is operable to adjust the threshold level to improve the identification of the target vehicle 26 in various ambient light conditions.

The image sensor 20 may correspond to any form of image or light sensor, for example a charge-coupled devices (CCD) or complementary metal-oxide-semiconductor (CMOS). The image sensor 20 may correspond to the imager disclosed in the SMART BEAM lighting control system manufactured by Gentex Corporation described in commonly assigned U.S. Provisional Patent Application Nos. 60/900,588, 60/902,728 and 61/008,762; U.S. Pat. Nos. 8,289,430, 8,305,471, 8,587,706; and 8,629,927, the disclosures of each of the above are incorporated in their entireties herein by reference. Further, detailed descriptions of such automatic vehicle exterior light control systems are described in commonly assigned U.S. Pat. Nos. 5,837,994, 5,990,469, 6,008,486, 6,130,448, 6,130,421, 6,049,171, 6,465,963, 6,403,942, 6,587,573, 6,611,610, 6,621,616, 6,631,316, 6,774,988, 6,861,809 and 8,045,760; and U.S. Provisional Patent Application Nos. 60/404,879 and 60/394,583, the disclosures of which are also incorporated herein in their entireties by reference. Also, commonly assigned U.S. Provisional Application Nos. 60/780,655 and 60/804,351, U.S. Pat. No. 8,339,526 and U.S. Patent Application Publication No. 2009/0096937 describe various displays for use with the present invention. The entire disclosures of each of these applications are also incorporated herein by reference.

The compass 74 may be implemented as any device operable to determine an absolute or relative direction or compass heading of the host vehicle 18, for example a magnetometer, etc. In order to assist in the detection of the target vehicle 26, the controller 12 may further utilize various input signals corresponding to the operating conditions of the host vehicle 18. A speed input 78 may be utilized to provide vehicle speed information to the controller 12. The speed input 78 may be utilized by the controller 12 in addition to the image data received from the image sensor 20 identify and discern among non-target objects and target vehicles (e.g. target vehicle 26).

In response to the detection of the target vehicle 26, the controller 12 may be configured to control a headlamp drive 80. The headlamp drive 80 is configured to control low beam headlamps and high beam headlamps of the host vehicle 18. The controller 12 may be configured to output signals to the various vehicle systems, for example driver assist systems to identify a detection of at least one object or feature of interest in the image data. In this manner, controller 12 is operable to control the various vehicle systems to improve vehicle operation. At least one implementation of a headlight control system 14 is taught in U.S. Pat. No. 6,049,171, entitled "CONTINUOUSLY VARIABLE HEADLAMP CONTROL," filed by Joseph Stam et al. on Sep. 18, 1998, the disclosure of which is incorporated herein by reference.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. An apparatus configured to adjust a processing function for image data for a vehicle control system, the apparatus comprising:

an image sensor configured to capture the image data corresponding to a field of view;

a controller in communication with the image sensor; and an inertial sensor in communication with the controller, wherein the controller is operable to:

receive the image data from the image sensor;

receive an acceleration signal corresponding to an orientation of a host vehicle from the inertial sensor;

initiate a function configured to scan the image data for at least one characteristic of a target vehicle;

offset an origin of the field of view of the image data to generate an adjusted origin in response to the acceleration signal;

utilize the adjusted origin for identifying the characteristic in the image data; and output a control signal configured to communicate the identification of the at least one characteristic of the target vehicle, wherein the control signal is output to a headlight control system configured to control an aim or a level of a headlight of the host vehicle.

2. The apparatus according to claim 1, wherein the field of view corresponds to a forward directed region relative the host vehicle.

3. The apparatus according to claim 1, wherein the at least one characteristic corresponds to an emission of light originating from at least one of a headlight and a taillight of the target vehicle.

4. The apparatus according to claim 1, wherein the controller is further operable to process the function with the adjusted origin to identify the characteristic of the target vehicle.

5. The apparatus according to claim 4, wherein the adjusted origin is determined based on a change in the orientation of the host vehicle as determined from the acceleration signal.

6. The apparatus according to claim 1, wherein the scan of the image data comprises filtering objects corresponding to non-target objects based on the adjusted origin.

7. An apparatus configured to adjust a processing function for image data for a vehicle control system, the apparatus comprising:

an image sensor configured to capture the image data corresponding to a field of view;

a controller in communication with the image sensor; and an inertial sensor configured to communicate a signal with the controller, wherein the controller is operable to:

receive the image data from the image sensor;

receive an orientation of a host vehicle from the inertial sensor;

initiate a function configured to scan the image data for at least one characteristic of a target vehicle;

calculate a speed of the vehicle from the signal;

utilize the speed to configure at least one function to identify a rate of motion of the at least one characteristic in the image data; and output a control signal configured to communicate the identification of the at least one characteristic of the target vehicle, wherein the control signal is output to a headlight control system configured to control an aim or a level of a headlight of the host vehicle.

8. The apparatus according to claim 7, wherein the controller is in communication with a direction detection device operable to detect a heading direction of the vehicle.

9. The apparatus according to claim 8, wherein direction detection device comprises one of a magnetometer, a compass, and any suitable directional detection device.

10. The apparatus according to claim 9, wherein the speed of the vehicle is determined by integrating the signal over time in response to the heading direction identifying that the vehicle is moving in a significantly straight line.

11. The apparatus according to claim 9, wherein a centripetal acceleration component of the signal is divided by an angular velocity, calculated from the heading direction, to determine the speed of the vehicle in response to the heading direction identifying that the vehicle is turning.

12. The apparatus according to claim 7, wherein the acceleration signal is compared to a predetermined noise-motion threshold to identify that the vehicle is stationary.

13. The apparatus according to claim 7, wherein the signal is compared to an average of the signal to determine a plurality of signal spikes corresponding to the number of axles of the vehicle.

14. The apparatus according to claim 7, wherein a distance between two axles of the vehicle is divided by a time delta between the plurality of signal spikes to calculate the speed of the vehicle.

15. A method of utilizing an imager system to control a vehicle system, the method comprising:

receiving image data;

receiving an orientation signal of a host vehicle;

initiating a function configured to scan the image data for at least one characteristic of a target vehicle;

setting a processing window of an image processing algorithm based on the orientation signal;

scanning the processing window for the at least one characteristic of the target vehicle; and outputting a control signal configured to communicate the identification of the at least one characteristic of the target vehicle, wherein the control signal is output to a headlight control system configured to control an aim or a level of a headlight level of the host vehicle.

16. The method according to claim 15, wherein the at least one object corresponds to at least one of a headlight and a taillight of the target vehicle.

17. The method according to claim 15, wherein the processing window is set based on a change in an orientation of the host vehicle relative to a direction of gravity.

18. The method according to claim 15, wherein the processing window is adjusted upward in a field of view of the image data in response to the orientation data communicating that the host vehicle is operating on an incline.

* * * * *